(12) United States Patent
Tian et al.

(10) Patent No.: US 10,514,076 B2
(45) Date of Patent: Dec. 24, 2019

(54) SHOCK ABSORBER FOR AIRCRAFTS

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 0 days.

(21) Appl. No.: 15/844,637

(22) Filed: Dec. 18, 2017

(65) Prior Publication Data

US 2018/0128338 A1 May 10, 2018

(30) Foreign Application Priority Data

Dec. 19, 2016 (CN) .......................... 2016 2 1396525

(51) Int. Cl.
*F16F 7/12* (2006.01)
*B64C 39/02* (2006.01)
(Continued)

(52) U.S. Cl.
CPC ................ *F16F 7/12* (2013.01); *F16F 15/08* (2013.01); *B64C 2201/127* (2013.01);
(Continued)

(58) Field of Classification Search
CPC .... F16F 7/12; F16F 15/08; F16F 3/093; F16F 2224/025; F16F 2224/0225; F16F 2230/005; F16F 2232/08; F16F 2234/02; F16F 2234/08; B64C 39/024; B64C 2201/127; B64D 47/08; G03B 15/006; B60G 11/00; B60G 11/38; B60G 9/003; B60G 15/06; B60G 17/023
(Continued)

(56) References Cited

U.S. PATENT DOCUMENTS 3,425,652 A * 2/1969 Leary ...................... F16F 15/08
248/632
3,436,042 A * 4/1969 Van Goubergen ...... F16F 1/376
248/636
(Continued)

FOREIGN PATENT DOCUMENTS

JP 01299340 A * 12/1989 ................ F16F 7/12

*Primary Examiner* — Robert A. Siconolfi
*Assistant Examiner* — San M Aung

(57) ABSTRACT

A shock absorber includes an upper vibration damping sheet and a lower vibration damping sheet. Multiple first vibration dampers and a second vibration damper are located between the upper vibration damping sheet and the lower vibration damping sheet; the first vibration dampers are close to an edge of both the upper vibration damping sheet and the lower vibration damping sheet. One end of the second vibration damper is located on the lower vibration damping sheet and is far away from the edge of the lower vibration damping sheet, the other end of the second vibration damper extends towards the upper vibration damping sheet along an axial direction of the lower vibration damping sheet, whereby when a carrier moves, the shock absorber provides a damping effect for a gimbal through the first vibration dampers and the second vibration damper. An aircraft includes the shock absorber mentioned above and a gimbal.

5 Claims, 2 Drawing Sheets

(51) Int. Cl.
*B64D 47/08* (2006.01)
*F16F 15/08* (2006.01)
*F16F 3/093* (2006.01)
*G03B 15/00* (2006.01)

(52) U.S. Cl.
CPC ........ *B64D 47/08* (2013.01); *F16F 2224/025* (2013.01); *F16F 2224/0225* (2013.01); *F16F 2230/0005* (2013.01); *F16F 2232/08* (2013.01); *F16F 2234/02* (2013.01); *F16F 2234/08* (2013.01); *G03B 15/006* (2013.01)

(58) Field of Classification Search
USPC ... 267/2, 141.1, 140.13, 158, 117, 131, 133; 188/371
See application file for complete search history.

(56) References Cited

U.S. PATENT DOCUMENTS

| | | | | |
|---|---|---|---|---|
| 4,820,952 A * | 4/1989 | Lee | ............ | H04R 7/04 310/322 |
| 2012/0316685 A1* | 12/2012 | Pettersson | ................ | F16F 3/00 700/275 |
| 2014/0119716 A1* | 5/2014 | Ohtomo | ................ | G01C 11/00 396/8 |
| 2016/0198088 A1* | 7/2016 | Wang | ................ | H04N 5/23238 348/36 |
| 2016/0229556 A1* | 8/2016 | Zhou | ...................... | B64D 47/08 |
| 2016/0327847 A1* | 11/2016 | Yang | ...................... | B64D 47/08 |

* cited by examiner

SHOCK ABSORBER FOR AIRCRAFTS

CROSS REFERENCE OF RELATED APPLICATION

The present invention claims priority under 35 U.S.C. 119(a-d) to CN 201621396525.2, filed Dec. 19, 2016.

BACKGROUND OF THE PRESENT INVENTION

Field of Invention

The present invention relates to a technical field of vibration attenuation, and more particularly to a shock absorber for an aircraft.

Description of Related Arts

With the continuous maturity of UAV (Unmanned Aerial Vehicle) technology, the UAV added with a gimbal for aerial photography has been widely used in firefighting, aerial photography, security, traffic dispersion, power inspection, geological exploration and other fields. UAVs are subject to vibration due to various factors during the flight. These vibrations will inevitably be transmitted to the gimbal, causing the gimbal to jitter, which adversely affects the imaging quality of the gimbal. In order to reduce the impact of the vibration of the UAV fuselage on the gimbal, a widely used vibration isolation measure is to add a vibration damper between the aircraft fuselage and the gimbal. However, the vibration damping effect of most of the shock absorbers in the prior art is better in good weather or when the external wind speed is smaller. When the external weather (for example, the wind speed is large) is greatly affected or the UAV swings violently during the flight, the gimbal itself will swing or shake at a larger angle, the damping effect of the shock absorber is not obvious, which seriously affects the working quality of the gimbal.

In view of the problem that the vibration damping effect of the shock absorber is not obvious when the gimbal swings or shakes at a larger angle due to the influence of the external environment, an effective solution has not been proposed yet.

SUMMARY OF THE PRESENT INVENTION

In view of the above problem, an object of the present invention is to provide a shock absorber and an aircraft, which is able to solve the technical problem that the vibration damping effect of the shock absorber is not obvious when the aircraft swings or shakes at a large angle in the prior art.

Firstly, the present invention provides a shock absorber for an aircraft, comprising an upper vibration damping sheet for connecting with a carrier, and a lower vibration damping sheet for connecting with a gimbal, wherein:

multiple first vibration dampers and a second vibration damper are located between the upper vibration damping sheet and the lower vibration damping sheet;

the first vibration dampers are located between the upper vibration damping sheet and the lower vibration damping sheet and are close to an edge of both the upper vibration damping sheet and the lower vibration damping sheet, wherein: one end of each of the first vibration dampers is connected with the upper vibration damping sheet, the other end of each of the first vibration dampers is connected with the lower vibration damping sheet;

one end of the second vibration damper is located on the lower vibration damping sheet and is far away from the edge of the lower vibration damping sheet, the other end of the second vibration damper extends towards the upper vibration damping sheet along an axial direction of the lower vibration damping sheet, whereby when the carrier moves, the shock absorber provides a damping effect for the gimbal through the first vibration dampers and the second vibration damper.

Preferably, both the first vibration dampers and the second vibration damper are made from elastic damping materials.

More preferably, the first vibration dampers are rubber vibration dampers, and the second vibration damper is a foam vibration damper.

More preferably, the rubber vibration dampers are cylindrical or spherical, and the foam vibration damper is cylindrical or spherical.

Preferably, the second vibration damper is located at a center of the lower vibration damping sheet, and a gap is provided between the other end of the second vibration damper and the upper vibration damping sheet.

Preferably, an amount of the second vibration dampers is larger than one, the multiple second vibration dampers are located on the lower vibration damping sheet and evenly distributed along a radial direction around a center of the lower vibration damping sheet.

Preferably, the first vibration dampers are in detachable connection with the upper vibration damping sheet and the lower vibration damping sheet; the edge of both the upper vibration damping sheet and the lower vibration damping sheet has multiple installation holes for respectively installing the first vibration dampers; each of the first vibration dampers comprises two installation columns which respectively match with an installation hole of the upper vibration damping sheet and the lower vibration damping sheet.

Preferably, both the upper vibration damping sheet and the lower vibration damping sheet are rectangles with a size matching with each other; an amount of the first vibration dampers is four and respectively located at an edge of four vertexes of the rectangle.

More preferably, an amount of the second vibration damper is one, located at a center of the lower vibration damper and extends towards the upper vibration damping sheet along an axial direction of the lower vibration damper.

Secondly, the present invention provides an aircraft, comprising the shock absorber mentioned above, and a gimbal, wherein the shock absorber, the gimbal and an aircraft fuselage are in detachable connection; the gimbal is located on the lower vibration damping sheet of the shock absorber through a gimbal base; the upper vibration damping sheet of the shock absorber is in detachable connection with the aircraft fuselage.

The present invention has beneficial effects as follows.

According to the embodiments of the present invention, through the first vibration dampers and the second vibration damper which are located between the upper vibration damping sheet and the lower vibration damping sheet, the shock absorber provides the damping effect for the gimbal which is located on the lower vibration damping sheet; when the gimbal swings or shakes at a larger angle, the second vibration damper reduces the vibration influence; and simultaneously, the shock absorber is simple in structure and obvious in vibration damping effect, which further improves the user experience.

Through connecting the shock absorber with the gimbal, the aircraft provided by the second embodiment of the present invention is able to provide the effective damping effect for the gimbal through the shock absorber when the aircraft violently swings. Further, the second vibration damper of the shock absorber is made of foam and has light weight, low cost, simple structure and obvious damping effect, so that the working efficiency of the fuselage is improved.

Additional features and advantages of the present invention will be set forth in the following description, and a part of the features and advantages will be obvious from the description, or may be learned by practice of the present invention. The objects and other advantages of the present invention will be realized and attained by the structure particularly pointed out in the specification and claims hereof as well as the appended drawings.

In order to make the above objects, features and advantages of the present invention more comprehensible and obvious, the preferred embodiments of the present invention are described below in detail with reference to the accompanying drawings.

BRIEF DESCRIPTION OF THE DRAWINGS

To describe the technical solutions in the embodiments of the present invention or in the prior art more clearly, the drawings which are required by the embodiments of the present invention or the prior art are briefly described as follows. Apparently, the accompanying drawings in the following description are some embodiments of the present invention, and those skilled in the art may obtain other drawings according to the accompanying drawings without creative efforts.

Figure 1:
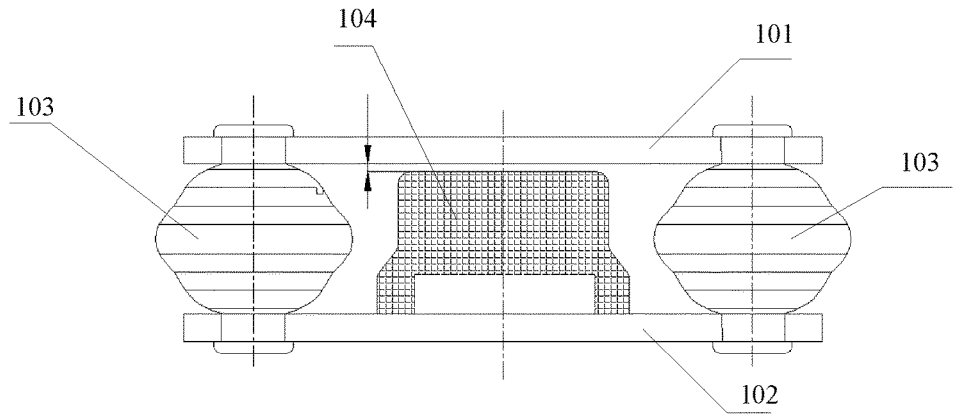
FIG. 1 is a front view of a shock absorber according to a first embodiment of the present invention.

In the drawings, 101: upper vibration damping sheet; 102: lower vibration damping sheet; 103: first vibration damper; 104: second vibration damper; 105: installation holes; 400: gimbal; 401: gimbal base; 402: lens.

DETAILED DESCRIPTION OF THE PREFERRED EMBODIMENT

To make the objectives, technical solutions and advantages of the embodiments of the present invention clearer, the technical solutions of the present invention are clearly and completely described with reference to the accompanying drawings as follows. Apparently, the described embodiments are only some of the embodiments of the present invention, but not all of the embodiments. All other embodiments obtained by those skilled in the art based on the embodiments of the present invention without creative efforts shall fall within the protective scope of the present invention.

In view of the problem that the vibration damping effect of the shock absorber is not obvious when the shock absorber of the prior art swings or shakes at a larger angle due to the influence of the external environment, the present invention provides a shock absorber and an aircraft to alleviate the above problem.

To facilitate understanding the embodiments of the present invention, a shock absorber disclosed in the embodiment of the present invention is firstly described in detail.

First Embodiment

According to the first embodiment of the present invention, a shock absorber comprises an upper vibration damping sheet for connecting with a carrier, and a lower vibration damping sheet for connecting with a gimbal, wherein: multiple first vibration dampers and a second vibration damper are located between the upper vibration damping sheet and the lower vibration damping sheet; the first vibration dampers are located between the upper vibration damping sheet and the lower vibration damping sheet and are close to an edge of both the upper vibration damping sheet and the lower vibration damping sheet; one end of each of the first vibration dampers is connected with the upper vibration damping sheet, the other end of each of the first vibration dampers is connected with the lower vibration damping sheet; one end of the second vibration damper is located on the lower vibration damping sheet and is far away from the edge of the lower vibration damping sheet, the other end of the second vibration damper extends towards the upper vibration damping sheet along an axial direction of the lower vibration damping sheet, such that when the carrier moves, the shock absorber provides the damping effect for the gimbal through the first vibration dampers and the second vibration damper.

FIG. 1 is a front view of the shock absorber according to the first embodiment of the present invention, which comprises an upper vibration damping sheet 101, a lower vibration damping sheet 102, multiple first vibration dampers 103 and a second vibration damper 104, wherein in actual use, the first vibration dampers 103 are detachably connected with both the upper vibration damping sheet 101 and the lower vibration damping sheet 102; an edge of both the upper vibration damping sheet 101 and the lower vibration damping sheet 102 has multiple installation holes (not shown in FIG. 1) for respectively installing the first vibration dampers 103; each of the first vibration dampers 103 comprises two installation columns (not shown in FIG. 1) which respectively match with an installation hole of the upper vibration damping sheet 101 and the lower vibration damping sheet 102.

Figure 2:
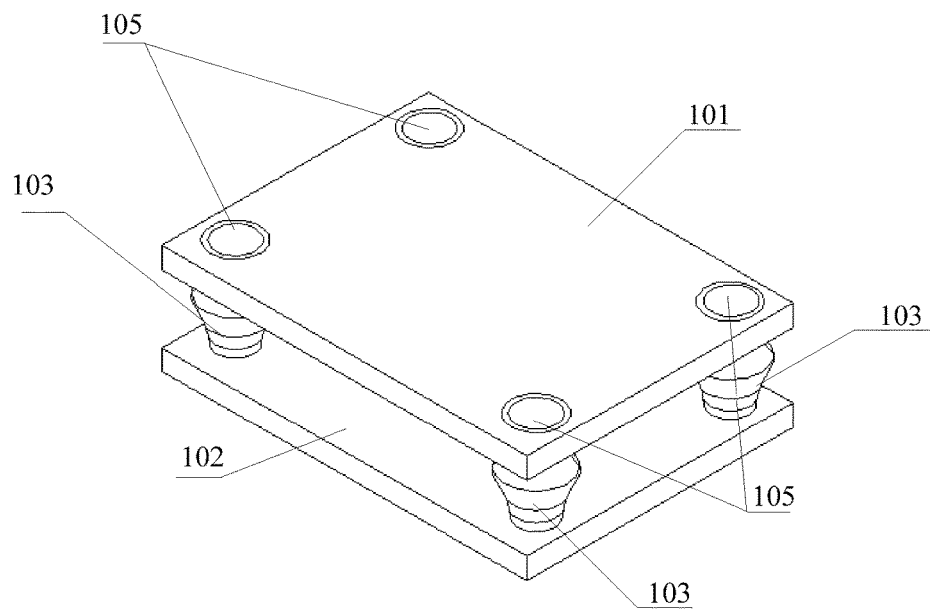
FIG. 2 is a three-dimensionally structural diagram of the shock absorber according to the first embodiment of the present invention.

FIG. 2 is a three-dimensionally structural diagram of the above-mentioned shock absorber which comprises the upper vibration damping sheet 101, the lower vibration damping sheet 102 and the multiple first vibration dampers 103, and has the multiple installation holes 105 which are provided at an edge of both the upper vibration damping sheet 101 and the lower vibration damping sheet 102, here, the second vibration damper is not shown in FIG. 2.

In actual use, the upper vibration damping sheet 101 and the lower vibration damping sheet 102 are rectangles which match with each other. For example, the upper vibration damping sheet and the lower vibration damping sheet are rectangular sheets with a same size, as shown in FIG. 2, and specifically, there are four first vibration dampers 103 which are respectively located at an edge of four vertices of the rectangular sheet. Simultaneously, the edge of the four vertices of the rectangular upper vibration damping sheet 101 and the lower vibration damping sheet 102 has the installation holes 105 which respectively cooperate with the installation columns of the first vibration dampers 103.

Figure 3:
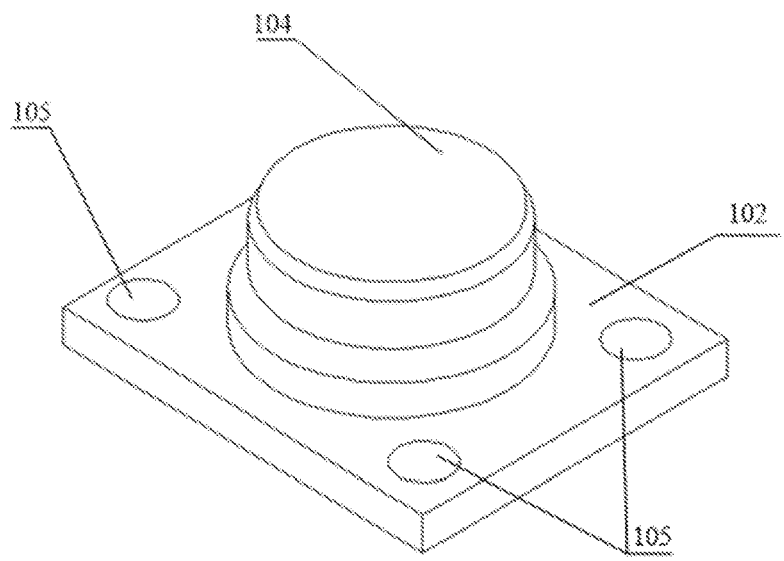
FIG. 3 is a three-dimensionally structural diagram of a second vibration damper of the shock absorber according to the first embodiment of the present invention.

More specifically, there is one second vibration damper which is located at a center of the lower vibration damping sheet and extends towards the upper vibration damping sheet along an axial direction of the lower vibration damping sheet. FIG. 3 is a three-dimensionally structural diagram of the second vibration damper according to the first embodiment of the present invention. In FIG. 3, the lower vibration damping sheet 102, the second vibration damper 104, and the multiple installation holes 105 are shown.

In actual use, the second vibration damper 104 is located at a center of the lower vibration damping sheet 102; a gap is provided between the other end of the second vibration damper 104 and the upper vibration damping sheet 101, which is able to be seen from the front view of the shock absorber shown in FIG. 1.

In actual use, due to the gap provided between the second vibration damper and the upper vibration damping sheet, the first vibration dampers, located at the edge of the upper vibration damping sheet and the lower vibration damping sheet, are able to provide the damping effect for the small angle swing of the gimbal which is connected with the lower vibration damping sheet; when the gimbal violently swings or shakes at a large angle, the lower vibration damping sheet is driven to swing, so that, there is a relative angle between the lower vibration damping sheet and the upper vibration damping sheet; at this time, the second vibration damper contacts the upper vibration damping sheet due to the large angle swing of the gimbal, so as to play a role of support and damping, for prevent the gimbal from continuously swinging at the large angle, thus further damping.

According to the first embodiment of the present invention, through the first vibration dampers and the second vibration damper which are located between the upper vibration damping sheet and the lower vibration damping sheet, the shock absorber provides the damping effect for the gimbal which is located on the lower vibration damping sheet. When the gimbal swings or shakes at the large angle, the second vibration damper reduces the vibration influence. Simultaneously, the shock absorber is simple in structure and obvious in vibration damping effect, which further improves the user experience.

It should be understood that the shock absorbers shown in FIGS. 1 to 3 are a preferred embodiment of the present invention; in other embodiments, the upper vibration damping sheet and the lower vibration damping sheet are able to be other shapes, such as round, which is not limited in the first embodiment of the present invention.

In actual use, the first vibration dampers and the second vibration damper are made from elastic damping materials; and more specifically, the first vibration dampers are rubber vibration dampers and the second vibration damper is a foam vibration damper.

Compared with other damping materials, the rubber damping material is larger in shape freedom, and simultaneously has a variety of performances such as vibration damping, cushioning and sound insulation. However, there are various rubber materials for the vibration damper, so that in actual use, aiming at different application environments and requirements, different rubber materials or a mixture of several rubber materials is used to improve the performance of rubber damping materials.

The foam damping material has light weight, heat insulation, sound absorption, shock absorption, corrosion resistance, mildew resistance, and better dielectric properties, in addition to the ability to absorb the impact load, and has excellent buffering vibration damping performance. Therefore, the foam damping material is able to effectively improve the overall performance of the shock absorber.

More specifically, the rubber vibration dampers are cylindrical or spherical, the foaming vibration damper is also cylindrical or spherical. It should be understood that the first vibration dampers and the second vibration damper shown in FIGS. 1 to 3 are only the preferred structure of the present invention but not the only structure of the present invention, which are able to be set in actual use according to actual situations and not be limited in the present invention.

Taking into account that in the actual use, the shock absorber has a wide range of applications and different damping effect and degree of vibration damping in different places, there are multiple second vibration dampers described in the above first embodiment, and the second vibration dampers are located on the lower vibration damping sheet and evenly distributed along a radial direction of the lower vibration damping sheet around a center thereof, so as to achieve the effective vibration damping. In actual use, an amount of the second vibration dampers is able to be set in accordance with requirements; and further, the shape and the height of the first vibration dampers and the second vibration dampers are able to be set in accordance with actual situations, which are not limited in the present invention.

It should be understood that similar reference numbers and letters shown in the drawings represent similar elements. Therefore, once one element is defined in one drawing, the element is not further defined and explained in following drawings.

Second Embodiment

In order to further understand the shock absorber provided in the above first embodiment, on the basis of the foregoing embodiment, according to the second embodiment of the present invention, an aircraft is provided, which comprises the shock absorber described in the above first embodiment and a gimbal, wherein the shock absorber, the gimbal and an aircraft fuselage are detachably connected with each other.

Figure 4:
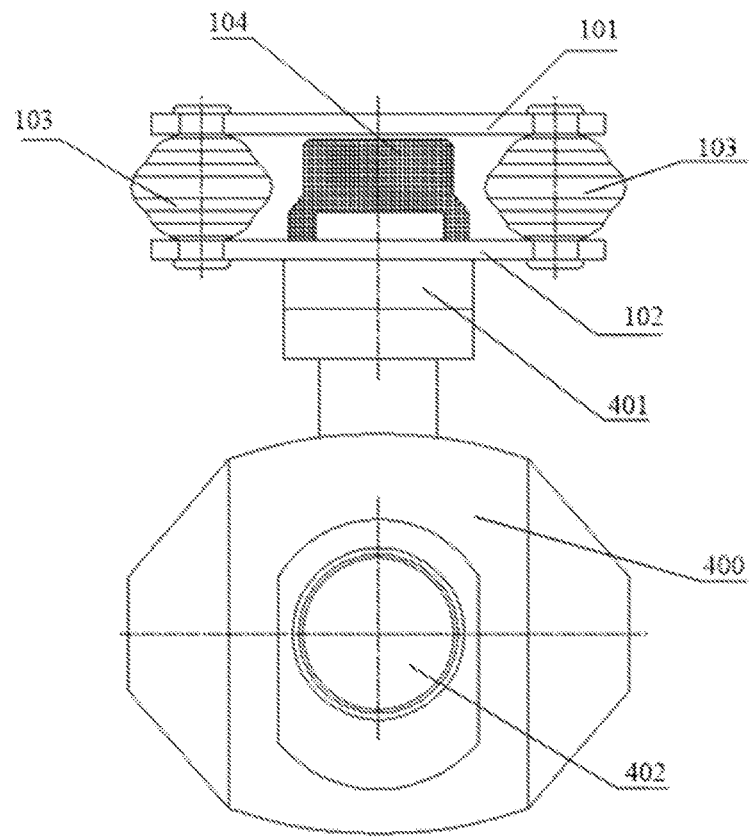
FIG. 4 is a front view which shows a connection relationship between a gimbal and a shock absorber in an aircraft according to a second embodiment of the present invention.

FIG. 4 is a front view, which shows the connection relationship between the gimbal and the shock absorber in an aircraft according to the second embodiment of the present invention. In FIG. 4, an upper vibration damping sheet 101, a lower vibration damping sheet 102, multiple first vibration dampers 103, a second vibration damper 104 and a gimbal 400 are shown, wherein: the gimbal comprises a sensor or an image collector. FIG. 4 shows the image collector according to the second embodiment, wherein a lens 402 is shown.

It should be understood that the above embodiment is only a preferred embodiment of the present invention; besides the lens 402, the sensor is able to be a sensor that measures environmental parameters or a sensor that detects the flight status of the aircraft. While being concretely implemented, the sensor is able to be set according to the actual situation, which is not limited by the second embodiment of the present invention.

Specifically, the gimbal 400 is located on the lower vibration damping sheet 102 of the shock absorber through a gimbal base 401; the upper vibration damping sheet 101 of the shock absorber is in detachable connection with a fuselage of the aircraft which is not shown in FIG. 4.

In actual use, under good weather, or less external wind conditions, the aircraft according to the second embodiment flies relatively stable, so at this time, the first vibration damper 103 is used to provide the vibration damping effect; while being subjected to external weather (such as larger wind speed) and the aircraft itself, the aircraft severely swings during the process of flight, added with the gimbal 400 itself is affected by the external wind, the gimbal 400 swings (or shakes) at a lager angle, so at this time, due to the combination between the second vibration damper 104 and the first vibration dampers 103, the second vibration damper 104 also blocks the large angle swing of the gimbal besides the damping effect of the first vibration dampers 103 is remained, which makes the gimbal 400 takes the better visual effect under the harsher working conditions, thereby ensuring the imaging quality of the fuselage.

Through connecting the shock absorber with the gimbal, the aircraft provided by the second embodiment of the present invention is able to provide the effective damping effect for the gimbal through the shock absorber when the aircraft violently swings. Further, the second vibration damper of the shock absorber is made of foam and has light weight, low cost, simple structure and obvious damping effect, so that the working efficiency of the gimbal is improved.

It should be understood that in the aircraft provided by the second embodiment, the shock absorber which is located between the fuselage and the gimbal is explained according to the first embodiment of the present invention; in other embodiments, the shock absorber provided by the first embodiment is able to be applied to other fields to act as damping, such as damping design during robot walking. In actual use, the shock absorber is able to be set in accordance with actual conditions, which is not limited by the embodiments of the present invention.

The aircraft according to the second embodiment of the present invention and the shock absorber according to the first embodiment of the present invention are same in technical characteristics, so same technical problems are able to be solved and same technical effects are able to be achieved.

Those skilled in the art is able to clearly understand that for the convenience and simplicity of the description, the specific working process of the foregoing system and apparatus may refer to the corresponding processes in the foregoing embodiments, which are not described herein again.

In addition, in the description of the embodiments of the present invention, the terms "installation", "connection" and "connected" should be broadly understood unless otherwise expressly stated and limited. For example, the connection may be a fixed connection, or a detachable connection, or an integrated connection; it may be a mechanical connection or an electrical connection; it may be directly connected or indirectly connected through intermediation; it may be an internal communication between two components. For those skilled in the art, the specific meanings of the above terms in the present invention may be understood based on specific situations.

In the description of the present invention, it should be noted that the terms "center", "upper", "lower", "left", "right", "vertical", "horizontal", "inner", "outer", or the like is based on the orientation or positional relationship shown in the drawings, which is merely for the convenience and simplification of describing the present invention rather than indicating or implying that the indicated apparatus or element must have a particular orientation and be manufactured and operated in a specific orientation, and therefore, the terms are unable to be understood as a limitation of the present invention. Moreover, the terms "first", "second" and "third" are used for descriptive purposes only and are not to be construed as indicating or implying the relative importance.

Finally, it should be noted that the above embodiments are merely specific implementation manners of the present invention for illustrating the technical solutions of the present invention, but not intended to limit the present invention. The protective scope of the present invention is not limited thereto. In spited that the foregoing embodiments of the present invention are described in detail, those skilled in the art should understand that changes or modifications still may be made to the technical solutions described in the foregoing embodiments, or equivalent replacements of part of the technical characteristics still may be made within the technical scope disclosed by the present invention. These modifications, changes, or substitutions do not make the essence of the corresponding technical solutions depart from the spirit and scope of the technical solutions of the embodiments of the present invention, which should be covered within the protective scope of the present invention. Therefore, the protective scope of the present invention should be subject to the protective scope of the claims.

What is claimed is:

1. A shock absorber for an aircraft, comprising an upper vibration damping sheet for connecting with a carrier, and a lower vibration damping sheet for connecting with a gimbal, wherein:
    multiple first vibration dampers and a second vibration damper are located between the upper vibration damping sheet and the lower vibration damping sheet;
    the first vibration dampers are close to an edge of both the upper vibration damping sheet and the lower vibration damping sheet, wherein: one end of each of the first vibration dampers is connected with the upper vibration damping sheet, the other end of each of the first vibration dampers is connected with the lower vibration damping sheet;
    one end of the second vibration damper is located on the lower vibration damping sheet and is far away from the edge of the lower vibration damping sheet, the other end of the second vibration damper extends towards the upper vibration damping sheet along an axial direction of the lower vibration damping sheet,
    whereby when the carrier moves, the shock absorber provides a damping effect for the gimbal through the first vibration dampers and the second vibration damper;
    the first vibration dampers are rubber vibration dampers, the second vibration damper is a foam vibration damper.

2. The shock absorber, as recited in claim 1, wherein the rubber vibration dampers are cylindrical or spherical, the foam vibration damper is cylindrical or spherical.

3. The shock absorber, as recited in claim 1, wherein: the second vibration damper is located at a center of the lower vibration damping sheet, and a gap is provided between the other end of the second vibration damper and the upper vibration damping sheet.

4. A shock absorber for an aircraft, comprising an upper vibration damping sheet for connecting with a carrier, and a lower vibration damping sheet for connecting with a gimbal, wherein:
    multiple first vibration dampers are located between the upper vibration damping sheet and the lower vibration damping sheet;

multiple second vibration dampers are located on the lower vibration damping sheet and evenly distributed along a radial direction around a center of the lower vibration damping sheet;

the first vibration dampers are close to an edge of both the upper vibration damping sheet and the lower vibration damping sheet, wherein: one end of each of the first vibration dampers is connected with the upper vibration damping sheet, the other end of each of the first vibration dampers is connected with the lower vibration damping sheet;

one end of each of the second vibration dampers is located on the lower vibration damping sheet and is far away from the edge of the lower vibration damping sheet, the other end of each of the second vibration dampers extends towards the upper vibration damping sheet along an axial direction of the lower vibration damping sheet, whereby when the carrier moves, the shock absorber provides a damping effect for the gimbal through the first vibration dampers and the second vibration dampers.

5. A shock absorber for an aircraft, comprising an upper vibration damping sheet for connecting with a carrier, and a lower vibration damping sheet for connecting with a gimbal, wherein:

multiple first vibration dampers are located between the upper vibration damping sheet and the lower vibration damping sheet;

a second vibration damper is located at a center of the lower vibration damper and extends towards the upper vibration damping sheet along an axial direction of the lower vibration damper;

the first vibration dampers are close to an edge of both the upper vibration damping sheet and the lower vibration damping sheet, wherein: one end of each of the first vibration dampers is connected with the upper vibration damping sheet, the other end of each of the first vibration dampers is connected with the lower vibration damping sheet;

one end of the second vibration damper is located on the lower vibration damping sheet and is far away from the edge of the lower vibration damping sheet, the other end of the second vibration damper extends towards the upper vibration damping sheet along an axial direction of the lower vibration damping sheet, whereby when the carrier moves, the shock absorber provides a damping effect for the gimbal through the first vibration dampers and the second vibration damper;

both the upper vibration damping sheet and the lower vibration damping sheet are rectangles with a size matching with each other; an amount of the first vibration dampers is four and respectively located at an edge of four vertexes of the rectangle.

* * * * *